Figure 1:
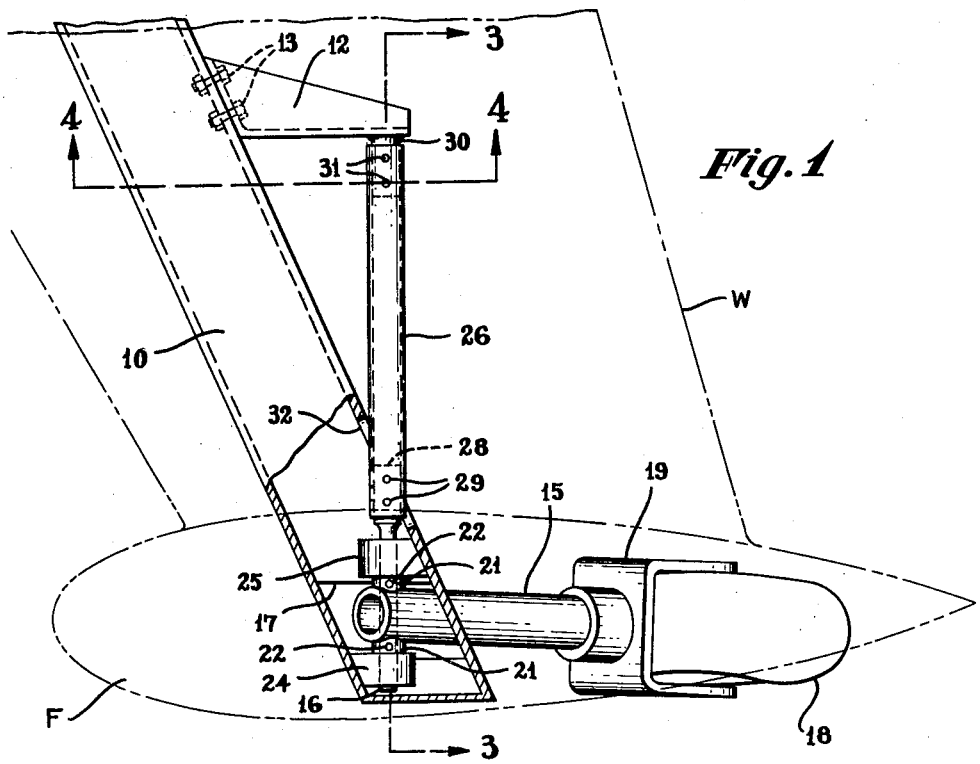

April 14, 1964    G. H. DAFFER    3,128,971
AIRCRAFT LANDING GEAR

Filed June 18, 1962    2 Sheets-Sheet 1

INVENTOR
GEORGE H. DAFFER
BY Watson, Cole, Grindle & Watson
ATTORNEYS

April 14, 1964   G. H. DAFFER   3,128,971
AIRCRAFT LANDING GEAR
Filed June 18, 1962   2 Sheets-Sheet 2
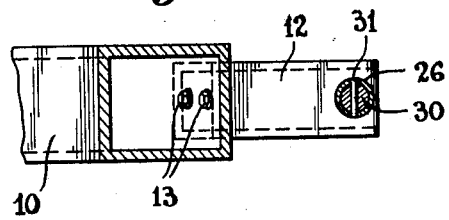
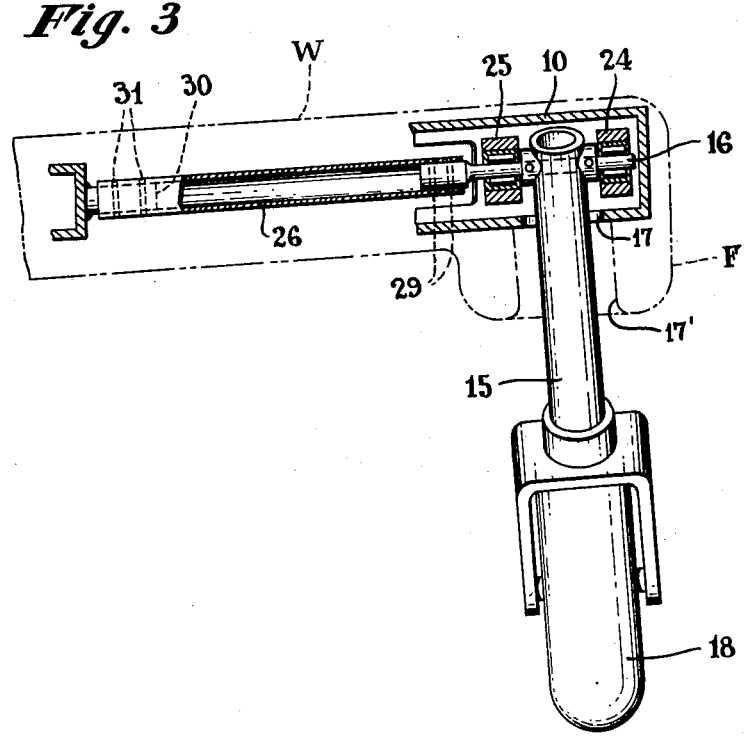
INVENTOR
GEORGE H. DAFFER
BY *Watson, Cole, Grindle & Watson*
ATTORNEYS United States Patent Office 3,128,971
Patented Apr. 14, 1964

3,128,971
AIRCRAFT LANDING GEAR
George H. Daffer, Shepherdstown, W. Va., assignor to Remaer, Inc., Williamsport, Md., a corporation of Maryland
Filed June 18, 1962, Ser. No. 203,063
3 Claims. (Cl. 244—104)

This invention relates to an aircraft landing gear structure of the class in which the landing surface contacting wheels or other elements are supported by forwardly and rearwardly swingable depending arms and in which the swinging movement is resiliently resisted by suitable torsion means. The torsion means is arranged to resiliently oppose both the horizontal and the vertical components of force to which the landing gear may be subjected during the course of a landing.

Although landing gear structure of this general type has heretofore been known, it has been comparatively complex in structure and the torsion means have necessarily been disposed in exposed positions outside of the aircraft structure and generally speaking have been incapable of incorporation in an assemblage having such small vertical dimension or thickness as to render it capable of being housed within the wing or wing tip or other airfoil section normally constituting part of the aircraft structure.

Moreover, in such prior landing gear it has been necessary to provide rigid supporting means for same entirely independently of or in addition to the existing frame structure of the aircraft, thereby resulting in both an increased weight and increased expense of construction.

With the foregoing in mind, the primary objects of the present invention are to provide a new arrangement and disposition of landing gear of the foregoing general type in which the landing gear structure is or may be supported directly by the main wing spars and in such manner that except for the landing gear supporting arms, the entire structure or assemblage may be confined when assembled within a vertical space no greater than the thickness of the wing spars, and thus may be readily incorporated and housed within the wing itself.

It is a further important object to provide such a structure which is particularly adapted for utilization or mounting at the wing tip portions of aircraft wings of the sweptback type. In such wings the several elements of the landing gear structure are so combined with the wing spars from which they are supported that they are enabled to take advantage of the diagonal disposition of the spar to enable the same better to resist the torsional forces transmitted thereto from the landing gear.

Further, more general objects are to achieve a considerably simpler, cheaper and more compact structure than has heretofore been attainable.

Thus, in order to achieve the primary objects of the invention, the rigid supporting arm for the landing gear has its upper end pivotally connected to the wing spar or other supporting frame structure for movement about a fixed axis, and such movement is resiliently resisted by a rectilinear torsion member having its rectilinear axis aligned with such fixed axis, the torsion member having one end fixedly connected to the arm and its other end fixed to the supporting frame structure at a location remote from the arm. Since the aforesaid axis will necessarily be substantially horizontal it will be readily apparent that the torsion member and the said pivotal connection to the supporting frame structure may all extend in a horizontal plane. Thus the resulting structure in addition to being simple, is obviously quite compact in a vertical plane whereby it may be readily incorporated within the wing structure.

A further important advantage of the invention may be realized by forming the spar as a hollow or tubular box girder and forming the pivotal connection between the girder and the supporting arm within the interior of the girder, whereby to firmly support as well as protect the resulting pivotal connection.

Further objects and advantages will be apparent from the following description together with the accompanying drawings, in which there is disclosed merely by way of exemplification the presently preferred embodiment of the invention.

Figure 2:
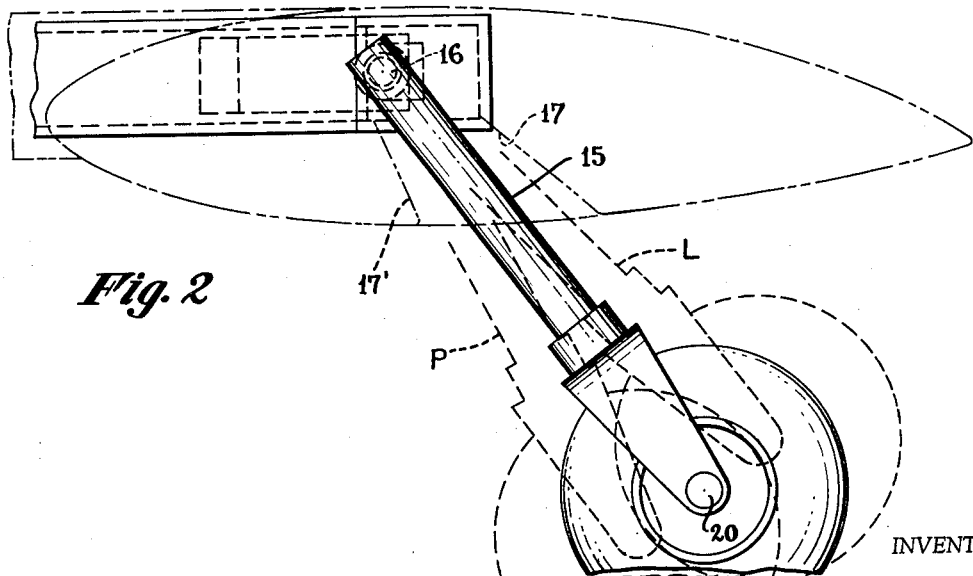

In the drawings:

FIGURE 1 is a plan view, partly in horizontal section, of an aircraft landing gear structure in accordance with the invention, a portion of the aircraft wing structure being shown in broken lines, FIGURE 2 is an end elevation of the structure shown in FIGURE 1, showing the landing gear in full lines in its normal position when supporting the aircraft at rest on a landing surface and in broken lines at opposite extremities of its range of swinging movements, FIGURE 3 is a detail view, partly in elevation and partly in section, on the line 3—3 of FIGURE 1, and FIGURE 4 is a detail section on the line 4—4 of FIGURE 1.

Referring now in detail to the accompanying drawings, the landing gear is shown as being of the wheel type which, by way of exemplification, is mounted at the tip of an amphibious aircraft wing structure W, terminating in a float F, the wing structure and float being shown in phantom only. It will be understood that the wing structure and float constitute no part of the invention itself but merely serve to make apparent one of the several advantageous modes of use of the invention.

It will be seen that the landing gear structure per se includes a rigid support 10 which preferably comprises the main wing spar. In conformity with the sweptback wing structure, of which it constitutes a part, the spar 10 preferably extends diagonally to the line of flight of the aircraft. The spar 10 is shown as of hollow or tubular box girder construction of rectangular cross section. The support or supporting means preferably also includes a reaction member or bracket 12 which in the preferred embodiment is fixedly secured directly to the spar 10 as by bolts 13, with its free end projecting horizontally rearwardly a substantial distance in trailing relation with respect to the spar.

Near the outer or free end of the spar 10 is the rigid depending suspension arm 15, of tubular construction having its upper end pivotally connected to the spar for angular movement about a fixed substantially horizontal axis, defined in the present instance by the shaft 16. This axis is, of course, normal to the usual line of flight of the aircraft so that the arm 15 is free to assume any of the various possible angular positions about the shaft 16 within the range indicated by the broken line showings P and L in FIGURE 2.

It will be seen that the arm 15 projects and is swingable through openings 17 and 17' in the lower horizontal wall of the spar 10 and in the wing structure W respectively.

At its lower end the arm 15 carries a suitable landing surface engaging element which might be in any of the conventional forms adapted for landing on ice, water or the like, though in the present instance it is exemplified as a usual conventional pneumatically tired wheel 18 rotatably supported in the wheel fork 19 at the lower end of the arm 15, the axle 20 of the wheel being supported in usual manner between the transversely opposed furcations of the fork 19.

In the present instance the cross shaft or axle 16 at the upper end of the arm 15 is fixedly secured to the arm 15, and to this end extends through sleeves 21—21 preferably integral with the arm 15. The axle 16 is fixedly secured against rotation to the arm 15 as by means of the pins 22 extending transversely through both the sleeves 21 and axle 16. The opposite ends of the axle 16 are rotatably received and supported in the bearings 24 and 25 respectively fixedly secured to the front and rear walls of the spar 10. It will be seen that by virtue of the parallel relationship of these walls the bearings 24 and 25 may be of similar construction and dimension though their positions are relatively reversed.

For resiliently opposing and cushioning the angular movement of the landing gear arm 15 there is provided the rectilinear torsion member 26 which, in the form shown, comprises an elongated tubular member of a suitable material such as either a metal or of a glass fiber reinforced phenolic resin or other resilient plastic, the material in any event having sufficient resiliency to permit elastic twisting thereof about its rectilinear axis. It will be seen that the torsion member 26 is disposed with its rectilinear axis in alignment with the axis of angular movement of the arm 15, as defined by the cross shaft 16. One end of the member 26 is fixedly connected to the arm 15, preferably through its shaft 16, to be subjected to a twisting action by the angular movement of the arm 15. The other or opposite end of the member 26 is fixedly connected or anchored to the supporting frame or structure as exemplified by the reaction member 12.

The preferred manner of interconnecting the shaft 16 and the torsion tube 26 consists in forming the shaft at one end with a cylindrical plug 28 which is snugly fitted into the adjacent open end of the tube 26 and then fixed in place against relative rotation as by means of the pins 29. The opposite end of the tube 26 may similarly be anchored to the free end of the reaction member 12 which projects somewhat across a position of alignment with the axis 16. To this end, there is welded or otherwise rigidly affixed to the reaction member 12 a cylindrical plug 30 having its axis coincident with the axis of the shaft 16, this plug being snugly received in the adjacent end of the torsion tube 26 remote from shaft or arm 15 and being fixed against relative rotary motion with respect to the tube 26 by means such as the pins 31. It will be noted from FIGURE 1 that the rear vertical wall of the spar 10 is provided with an opening 32 to permit passage of the torsion tube 26.

The operation of the landing gear above described is believed to be readily apparent. Normally the landing gear arm 15 and its wheel 18 will extend in a diagonal downwardly and rearward direction with respect to the normal line of movement of the aircraft, in the position shown in full lines in the drawings. This is the position in other words that will be assumed when the wheels are supporting the aircraft on a usual supporting surface and the aircraft itself is stationary. At this time it will be seen that the weight of the aircraft acting on the torsion member or element 26 through the lever arm 15 will have twisted the tube 26 enough to displace the arm 15 rearwardly somewhat from the position indicated by the broken lines P, which it will normally tend to assume when the craft is airborne.

On the other hand, when the aircraft is landing, taxiing or otherwise in motion on the ground or other supporting surface, the landing gear is free to resiliently yield both rearwardly and upwardly at least as far as the fully loaded or dotted line position indicated by the broken lines L in FIGURE 2. This movement toward fully loaded position may be caused in response either to vertical forces or to rearward horizontal forces of usual nature acting upon the landing gear.

In the preferred embodiment of the invention as illustrated herein, the diagonal relationship of the spar and the torsion tube, results in only a portion of the twisting force on the tube being transmitted as such to the spar. The remainder thereof is transmitted to the spar as a bending force. Thus, both the resistance of the spar to twisting and its resistance to bending are employed to advantage to withstand the forces transmitted from the torsion tube.

Moreover, the foregoing structure permits the obtaining of an assemblage having but a minimum thickness which is admirably adapted for use within the tip portion of an aircraft wing or within some other comparatively thin air foil section thereof.

In general, therefore, there has been provided an extremely strong, efficient, light and economical landing gear structure incorporating the several specific features and advantages earlier mentioned.

In this application I have shown and described only the preferred embodiment of the invention simply by way of illustration of the practice thereof. However, it is to be understood that the invention is capable of other and different embodiments and that its several details may be modified in various ways all without departing from invention as defined in the accompanying claims. Accordingly the drawings and description herein are to be regarded as merely exemplary and not as excluding other modifications or variations.

Having thus described my invention, I claim:

1. In combination with an aircraft wing of the swept back type including a rigid rectilinear main wing spar having a free outer end, said spar extending diagonally to the line of flight of the aircraft, a landing gear supporting arm having an upper end pivotally connected to the outer end portion of said spar for free angular movement about a substantially horizontal axis diagonal to the spar and normal to said line of flight, a reaction bracket rigidly secured to said spar at a lengthwise location thereon spaced inwardly from said arm, and projecting from said spar into alignment with said axis, and a rectilinear torsion member having its rectilinear axis aligned with said fixed axis, its opposite ends being fixedly connected respectively to said arm and to said reaction bracket.

2. Aircraft landing gear as defined in claim 1, in which said arm includes a cross shaft fixed thereto and defining the axis of said pivotal connection, said shaft being rotatably connected to said spar and fixedly connected to the adjacent end of said torsion tube.

3. In combination with an aircraft wing of the swept back type including a rigid rectilinear main wing spar having a free outer end, said spar extending diagonally to the line of flight of the aircraft and being of hollow tubular construction, a rigid depending supporting arm having its upper end received within said spar through an opening in the underside of said spar adjacent its free outer end, a landing surface engaging element at the lower end of said arm, bearing means within said spar, said arm having a transverse axle fixed to its upper end and journaled in said bearing means for angular movement about a fixed horizontal axis diagonal to the rectilinear axis of said spar and normal to the said line of flight, said tubular spar being formed with an opening in its side wall aligned with said axis, a reaction bracket rigidly secured to said spar at a lengthwise location thereon inwardly of and remote from said arm and projecting from said spar into alignment with said fixed horizontal axis, and a rectilinear torsion member extending through said last mentioned opening with its rectilinear axis aligned with said fixed axis, its opposite ends being fixedly secured respectively to said axle and to said bracket.

References Cited in the file of this patent

UNITED STATES PATENTS

| | | |
|---|---|---|
| 2,587,624 | Johnson | Mar. 4, 1952 |
| 2,954,188 | O'Connor | Sept. 27, 1960 |

FOREIGN PATENTS

| | | |
|---|---|---|
| 425,004 | Germany | Feb. 5, 1926 |
| 460,965 | Germany | June 4, 1928 |
| 438,165 | Great Britain | Nov. 12, 1935 |